United States Patent
Zaidi et al.

(10) Patent No.: US 9,729,454 B2
(45) Date of Patent: Aug. 8, 2017

(54) METHODS, SYSTEMS, AND COMPUTER READABLE MEDIA FOR BALANCING DIAMETER MESSAGE TRAFFIC RECEIVED OVER LONG-LIVED DIAMETER CONNECTIONS

(71) Applicant: Oracle International Corporation, Redwood Shores, CA (US)

(72) Inventors: Syed Mohsin Reza Zaidi, Cary, NC (US); Brian John Hassink, Cary, NC (US); Lalit Grover, Haryana (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 99 days.

(21) Appl. No.: 14/601,906

(22) Filed: Jan. 21, 2015

(65) Prior Publication Data
US 2016/0212052 A1 Jul. 21, 2016

(51) Int. Cl.
*H04L 12/801* (2013.01)
*G06F 9/50* (2006.01)

(52) U.S. Cl.
CPC .......... *H04L 47/193* (2013.01); *G06F 9/5083* (2013.01)

(58) Field of Classification Search
CPC ..... H04L 47/10; H04L 47/2441; H04L 47/30; H04L 47/32; H04L 12/5693
See application file for complete search history.

(56) References Cited

U.S. PATENT DOCUMENTS

| | | |
|---|---|---|
| 5,278,890 A | 1/1994 | Beeson et al. |
| 5,926,482 A | 7/1999 | Christie et al. |
| 6,029,191 A | 2/2000 | Kurashima |
| 6,108,409 A | 8/2000 | Cooper et al. |
| 6,157,621 A | 12/2000 | Brown et al. |
| 2,132,280 A1 | 8/2001 | Rekieta et al. |

(Continued)

FOREIGN PATENT DOCUMENTS

| | | |
|---|---|---|
| CN | 1777143 A | 5/2006 |
| CN | 101136943 A | 3/2008 |

(Continued)

OTHER PUBLICATIONS

Fajardo et al., "Diameter Base Protocol," IETF RFC 6733, pp. 1-152 (Oct. 2012).

(Continued)

*Primary Examiner* — Mark Rinehart
*Assistant Examiner* — Sanjay K Dewan
(74) *Attorney, Agent, or Firm* — Jenkins, Wilson, Taylor, & Hunt, P.A.

(57) ABSTRACT

Methods, systems, and computer readable media for providing a workload balancer for balancing message traffic received over long-lived Diameter connections are disclosed. One exemplary workload balancer includes at least one connection front end processor for terminating Diameter connections with external nodes. The workload balancer further includes a plurality of Diameter back end processors for performing application or routing processing for the Diameter messages received over the Diameter connections. The at least one connection front end processor load shares Diameter messages received over existing Diameter connections among the back end processors.

21 Claims, 10 Drawing Sheets

(56) References Cited

U.S. PATENT DOCUMENTS

| | | |
|---|---|---|
| 6,327,472 B1 | 12/2001 | Westroos et al. |
| 6,515,985 B2 | 2/2003 | Shmulevich et al. |
| 6,628,672 B1 | 9/2003 | Cabello |
| 6,647,113 B2 | 11/2003 | McCann et al. |
| 6,662,017 B2 | 12/2003 | McCann et al. |
| 6,678,369 B2 | 1/2004 | DeMent et al. |
| 6,760,343 B1 | 7/2004 | Krishnamurthy et al. |
| 6,785,378 B1 | 8/2004 | Mar |
| 6,788,774 B1 | 9/2004 | Caldwell et al. |
| 6,826,198 B2 | 11/2004 | Turina et al. |
| 6,901,262 B2 | 5/2005 | Allison et al. |
| 6,944,184 B1 | 9/2005 | Miller et al. |
| 6,965,567 B2 | 11/2005 | Ramos et al. |
| 7,023,794 B2 | 4/2006 | Khan et al. |
| 7,043,003 B1 | 5/2006 | Friedl |
| 7,050,562 B2 | 5/2006 | Allison et al. |
| 7,068,773 B2 | 6/2006 | McCann et al. |
| 7,079,499 B1 | 7/2006 | Akhtar et al. |
| 7,092,388 B2 | 8/2006 | Jarlstedt |
| 7,092,505 B2 | 8/2006 | Allison et al. |
| 7,127,057 B2 | 10/2006 | Delaney et al. |
| 7,136,477 B2 | 11/2006 | Craig et al. |
| 7,197,036 B2 | 3/2007 | Craig |
| 7,222,192 B2 | 5/2007 | Allison et al. |
| 7,257,215 B2 | 8/2007 | Angermayr et al. |
| 7,260,086 B2 | 8/2007 | Delaney et al. |
| 7,286,524 B1 | 10/2007 | Loftus |
| 7,298,725 B2 | 11/2007 | Rune |
| 7,372,953 B2 | 5/2008 | Delaney et al. |
| 7,403,492 B2 | 7/2008 | Zeng et al. |
| 7,440,472 B2 | 10/2008 | Delaney et al. |
| 7,522,580 B2 | 4/2009 | Miller et al. |
| 7,532,647 B2 | 5/2009 | Eichler et al. |
| 7,554,974 B2 | 6/2009 | Palmer et al. |
| 7,564,870 B2 | 7/2009 | Miller et al. |
| 7,590,732 B2 | 9/2009 | Rune |
| 7,633,969 B2 | 12/2009 | Caugherty et al. |
| 7,760,706 B2 | 7/2010 | Delaney et al. |
| 7,898,957 B2 | 3/2011 | Lea et al. |
| 8,201,219 B2 | 6/2012 | Jones |
| 8,369,313 B2 | 2/2013 | Lu et al. |
| 8,423,678 B2 | 4/2013 | Darbyshire et al. |
| 8,468,267 B2 | 6/2013 | Yigang et al. |
| 8,478,828 B2 | 7/2013 | Craig et al. |
| 8,483,233 B2 | 7/2013 | Craig et al. |
| 8,504,630 B2 | 8/2013 | Craig et al. |
| 8,578,050 B2* | 11/2013 | Craig .................... H04L 45/306 370/401 |
| 8,799,391 B2 | 8/2014 | Craig et al. |
| 8,817,627 B2 | 8/2014 | Delaney et al. |
| 8,879,431 B2 | 11/2014 | Ridel et al. |
| 8,958,306 B2* | 2/2015 | McCann ............. H04L 63/0263 370/241 |
| 9,088,478 B2* | 7/2015 | Craig .................. H04L 63/0892 |
| 2001/0029182 A1 | 10/2001 | McCann et al. |
| 2001/0055380 A1 | 12/2001 | Benedyk et al. |
| 2002/0116522 A1 | 8/2002 | Zelig |
| 2002/0141346 A1 | 10/2002 | Garcia-Luna-Aceves et al. |
| 2002/0176430 A1 | 11/2002 | Sangha et al. |
| 2002/0186702 A1 | 12/2002 | Ramos et al. |
| 2003/0061234 A1 | 3/2003 | Ali et al. |
| 2003/0108067 A1 | 6/2003 | Craig et al. |
| 2003/0115358 A1 | 6/2003 | Yun |
| 2003/0169779 A1 | 9/2003 | Craig |
| 2004/0037278 A1 | 2/2004 | Wong et al. |
| 2004/0081206 A1 | 4/2004 | Allison et al. |
| 2004/0203849 A1 | 10/2004 | Allison et al. |
| 2004/0240658 A1 | 12/2004 | Delaney et al. |
| 2004/0264675 A1 | 12/2004 | Delaney et al. |
| 2005/0013290 A1 | 1/2005 | Allison et al. |
| 2005/0047401 A1 | 3/2005 | Garnero et al. |
| 2005/0111442 A1 | 5/2005 | Delaney et al. |
| 2005/0120095 A1 | 6/2005 | Aman et al. |
| 2005/0232407 A1 | 10/2005 | Craig et al. |
| 2005/0235065 A1 | 10/2005 | Le et al. |
| 2006/0013264 A1 | 1/2006 | Eichler et al. |
| 2006/0067503 A1 | 3/2006 | Caugherty et al. |
| 2006/0101159 A1 | 5/2006 | Yeh et al. |
| 2007/0180113 A1 | 8/2007 | Van Bemmel |
| 2008/0013446 A1 | 1/2008 | Xu et al. |
| 2008/0043614 A1 | 2/2008 | Soliman |
| 2008/0127232 A1* | 5/2008 | Langen ............. H04L 29/12188 719/328 |
| 2009/0083861 A1* | 3/2009 | Jones ...................... G06F 9/505 726/29 |
| 2010/0299451 A1 | 11/2010 | Yigang et al. |
| 2011/0116382 A1 | 5/2011 | McCann et al. |
| 2011/0199906 A1 | 8/2011 | Kanode et al. |
| 2011/0200053 A1 | 8/2011 | Kanode et al. |
| 2011/0200054 A1 | 8/2011 | Craig et al. |
| 2011/0202604 A1 | 8/2011 | Craig et al. |
| 2011/0202612 A1 | 8/2011 | Craig et al. |
| 2011/0202613 A1 | 8/2011 | Craig et al. |
| 2011/0202614 A1 | 8/2011 | Graig et al. |
| 2011/0202676 A1 | 8/2011 | Craig et al. |
| 2011/0202677 A1 | 8/2011 | Craig et al. |
| 2011/0202684 A1 | 8/2011 | Craig et al. |
| 2011/0314178 A1 | 12/2011 | Kanode et al. |
| 2013/0094362 A1 | 4/2013 | Qiu et al. |
| 2013/0322430 A1* | 12/2013 | Mann .................... H04L 47/726 370/352 |
| 2013/0329740 A1 | 12/2013 | Wallace et al. |
| 2013/0346549 A1 | 12/2013 | Craig et al. |
| 2014/0237111 A1 | 8/2014 | McMurry et al. |
| 2014/0304415 A1* | 10/2014 | Prakash .................. H04L 47/70 709/226 |
| 2016/0191631 A1* | 6/2016 | Haraszti ................. H04L 67/14 709/227 |
| 2017/0034048 A1 | 2/2017 | Karandikar et al. |

FOREIGN PATENT DOCUMENTS

| | | |
|---|---|---|
| CN | 101150512 A | 3/2008 |
| CN | 101588606 A | 11/2009 |
| CN | 201180018814.2 | 2/2011 |
| CN | 201180013681.X | 6/2015 |
| CN | 102893556 B | 8/2016 |
| EP | 1 134 939 A1 | 9/2001 |
| EP | 2 534 790 B1 | 4/2016 |
| JP | H0537596 | 2/1993 |
| WO | WO 00/60812 | 10/2000 |
| WO | WO 2005/052743 | 6/2005 |
| WO | WO 2006/036500 | 4/2006 |
| WO | WO 2008/105976 | 9/2008 |
| WO | WO 2009/070179 A1 | 6/2009 |
| WO | WO 2009/128837 A1 | 10/2009 |
| WO | WO 2011/100587 | 8/2011 |
| WO | WO 2011/100594 | 8/2011 |
| WO | WO 2011/100603 | 8/2011 |

OTHER PUBLICATIONS

"Traffix Diameter Load Balancer; Scaling the Diameter Control Plane," Traffix Systems, pp. 1-4 (Publication Date Unknown) (Downloaded from the Internet on Feb. 8, 2010).

Letter regarding Certificate of Patent for Israeli Patent Application No. 221424 (Jul. 1, 2016).

Letter regarding Decision to Grant for Chinese Application No. ZL201180013555.4 (Apr. 21, 2016).

Letter regarding Decision to Grant for European Application No. 11742901.9 (Apr. 1, 2016).

Letter regarding Notification to Grant for Chinese Patent Application No. ZL201180013814.2 (Jul. 20, 2015).

Extended European Search Report for European Application No. 11742906.8 (Jun. 26, 2015).

Letter regarding Decision to Grant for Chinese Patent Application No. ZL201180013681.X (Apr. 13, 2015).

Second Office Action for Chinese Patent Application No. 201180013555.4 (Mar. 20, 2015).

Letter regarding Notice Before Examination for Israel Patent Application No. 221424 (Jan. 11, 2015).

(56) References Cited

OTHER PUBLICATIONS

First Office Action for Chinese Patent Application No. 201180018814.2 (Oct. 30, 2014).
First Office Action for Chinese Application No. 201180013681.X (Aug. 18, 2014).
First Office Action for Chinese Patent Application No. 201180013555.4 (Jul. 3, 2014).
Notice of Allowance for U.S. Appl. No. 12/797,197 dated May 21, 2014.
Notice of Allowance and Fee(s) Due for U.S. Appl. No. 13/932,608 (Apr. 9, 2014).
Final Office Action for U.S. Appl. No. 12/797,197 dated Jan. 27, 2014.
"Diameter Interface Support," Chapter 2, Cisco Service Control Mobile Solution Guide, http://www.cisco.com/c/en/us/td/docs/cable/serv_exch/serv_control/broadband_app/rel41x/mobile_sol/mobile_sol/02_mobile_diameter.pdf, pp. 2-1-2-8 (Dec. 23, 2013).
Extended European Search Report for European Application No. 11742894.6 (Dec. 3, 2013).
"IP Front End (IPFE) User Guide," Eagle® XG Diameter Signaling Router, 910-6826-001 Revision A, pp. 1-29 (Nov. 2013).
Non-Final Office Action for U.S. Appl. No. 12/797,197 dated Jul. 3, 2013.
Commonly-Assigned, Co-Pending U.S. Appl. No. 13/932,608 titled "Methods, Systems, and Computer Readable Media for Inter-Diameter-Message Processor Routing," (unpublished, filed Jul. 1, 2013).
Notice of Allowance and Fee(s) Due for U.S. Appl. No. 13/026,075 (Jun. 27, 2013).
Notice of Allowance and Fee(s) Due for U.S. Appl. No. 13/026,031 (May 30, 2013).
Supplemental Notice of Allowability for U.S. Appl. No. 13/026,031 (Mar. 22, 2013).
Notice of Allowance and Fee(s) Due for U.S. Appl. No. 13/025,968 (Feb. 27, 2013).
Final Office Action for U.S. Appl. No. 12/797,197 dated Feb. 11, 2013.
Notice of Allowance and Fee(s) Due for U.S. Appl. No. 13/026,031 (Jan. 30, 2013).
Final Official Action for U.S. Appl. No. 13/026,076 (Dec. 7, 2012).
Communication of European Publication Number and Information on the Application of Article 67(3) EPC for European Patent Application No. 11742906.8 (Nov. 21, 2012).
Communication of European Publication Number and Information on the Application of Article 67(3) EPC for European Patent Application No. 11742901.9 (Nov. 21, 2012).
Communication of European Publication Number and Information on the Application of Article 67(3) EPC for European Patent Application No. 11742894.6 (Nov. 21, 2012).
Non-Final Office Action for U.S. Appl. No. 12/797,197 dated Jul. 9, 2012.
Non-Final Official Action for U.S. Appl. No. 13/026,076 (Jun. 4, 2012).
Notification of Transmittal of the International Search Report and the Written Opinion of the International Searching Authority, or the Declaration for International Application No. PCT/US2011/024614 (Oct. 31, 2011).
Notification of Transmittal of the International Search Report and the Written Opinion of the International Searching Authority, or the Declaration for International Application No. PCT/US2011/024601 (Oct. 20, 2011).
Notification of Transmittal of the International Search Report and the Written Opinion of the International Searching Authority, or the Declaration for International Application No. PCT/US2011/024588 (Oct. 20, 2011).
Communication pursuant to Article 94(3) EPC for European Application No. 04 811 530.7 (Feb. 11, 2011).
Notice of Allowance for U.S. Appl. No. 10/993,738 dated Jun. 25, 2010.

Commonly-assigned, co-pending U.S. Appl. No. 12/797,197 for "Methods and Systems for Message Transfer Part (MTP) Load Sharing Using MTP Load Sharing Groups", (Unpublished, filed Jun. 9, 2010).
Notice of Allowance for U.S. Appl. No. 10/993,738 dated Mar. 5, 2010.
"Traffix Diameter Gateway; Instant Diameter Connection to any Network Element," Traffix Systems, pp. 1-4 (Publication Date Unknown) (Downloaded from the Internet on Feb. 8, 2010).
"Next Generation Networks Load Balancing—The Key to NGN Control, Management, and Growth," Whitepaper by Traffix Systems, pp. 1-7 (Publication Date Unknown) (Downloaded from the Internet on Feb. 8, 2010).
"Universal Mobile Telecommunications Systems (UMTS): LTE: InterWorking Function (IWF) Between MAP Based and Diameter Based interfaces (3GPP TS 29.305 Version 9.0.0 Release 9)," ETSI TS 129 305 V9.0.0 (Jan. 2010).
"Digital Cellular Telecommunications System (Phase 2+); Universal Mobile Telecommunications System (UMTS); LTE; IP Multimedia (IM) Subsystem Cx and Dx Interfaces; Signalling Flows and Message Contents (3GPP TS 29.228 Version 8.7.0 Release 8)," ETSI TS 129 228 v8.7.0 (Jan. 2010).
Jones et al., "Diameter Extended NAPTR," Individual Submission Internet-Draft, draft-ietf-dime-extended-naptr-00, pp. 1-9 (Dec. 29, 2009).
3GPP, "3rd Generation Partnership Project; Technical Specification Group Core Network and Terminals; Diameter-based Protocols Usage and Recommendations in 3GPP (Release 9)," 3GPP TR 29.909 V9.0.0 (Dec. 2009).
Jiao et al., "The Diameter Capabilities Update Application," Network Working Group Internet-Draft draft-ietf-dime-capabilities-update-01, pp. 1-8 (Dec. 1, 2009).
Supplemental Notice to Allowability for U.S. Appl. No. 11/147,144 (Nov. 17, 2009).
Tsou et al. "Realm-Based Redirection in Diameter," Internet Engineering Task Force, draft-ietf-dime-realm-based-redirect-02, pp. 1-7 (Oct. 27, 2009).
Huang et al., "The Diameter Precongestion Notification (PCN) Data Collection Applications," Network Working Group Internet-Draft <draft-huang-dime-pcn-collection-02>, pp. 1-19 (Oct. 26, 2009).
Carlberg et al., "Diameter Priority Attribute Value Pairs," Diameter Maintenance and Extensions (DIME) Internet-Draft <draft-carlberg-dime-priority-avps-00.txt>, pp. 1-6 (Oct. 19, 2009).
Korhonen et al., "Diameter User-Name and Realm Based Request Routing Clarifications," Diameter Maintenance and Extensions (DIME) Internet-Draft, draft-ietf-dime-nai-routing-04.txt, pp. 1-13 (Oct. 6, 2009).
Fajardo et al., "Diameter Base Protocol," DIME Internet-Draft, draft-ietf-dime-rfc3588bis-19.txt, pp. 1-160 (Sep. 2, 2009).
Notice of Allowance and Fee(s) Due for U.S. Appl. No. 11/147,144 (Aug. 17, 2009).
Tsou et al., "Session-Spectific Explicit Diameter Request Routing," Network Working Group Internet-Draft, draft-tsou-diameter-explicit-routing-03, pp. 1-18 (Aug. 5, 2009).
Non-Final Office Action for U.S. Appl. No. 10/993,733 dated Jul. 16, 2009.
Official Action for U.S. Appl. No. 11/147,144 (Jul. 7, 2009).
Bhardwaj, "Roaming Hubbing & LTE," GSMA London, pp. 1-11 (May 19, 2009).
Matijašević et al., "Mechanisms for Diameter service performance enhancement," http://www.mrtc.mdh.se/qimpress/files/SoftCOM_DMatijasevic.pdf, pp. 1-5 (2009).
Non-Final Office Action for U.S. Appl. No. 10/993,733 dated Nov. 13, 2008.
Official Action for U.S. Appl. No. 11/147,144 (Nov. 13, 2008).
Tsou et al., "Diameter Routing Extensions," draft-tsou-dime-base-routing-ext-04, Internet-Draft, pp. 1-28 (Jul. 29, 2008).
Notification of Transmittal of the International Search Report and the Written Opinion of the International Searching Authority, or the Declaration for International Application No. PCT/US05/32070 (Jul. 11, 2008).
Supplementary European Search Report for European Patent Application No. 04811530.7-1249 (Apr. 15, 2008).

(56) References Cited

OTHER PUBLICATIONS

Non-Final Office Action for U.S. Appl. No. 10/993,738 dated Feb. 5, 2008.
Notification of European publication number and information on the application of Article 67(3) EPC for European Application No. 04811530.7 (Aug. 9, 2006).
Notification of Transmittal of the International Search Report and the Written Opinion of the International Searching Authority, or the Declaration for International Application No. PCT/US2004/38827 (Jul. 11, 2006).
Liu et al., "Introduction to Diameter," Developer Works http://www.ibm.com/developerworks/library/wi-diameter/index.html (Downloaded from the Internet on Aug. 2, 2011), pp. 1-9 (Jan. 24, 2006).
Eronen et al., "Diameter Extensible Authentication Protocol (EAP) Application," Network Working Group, RFC 4072, pp. 1-31 (Aug. 2005).
Calhoun et al., "Diameter Base Protocol," Network Working Group, RFC 3588, pp. 1-148 (Sep. 2003).
Sidebottom et al., "Signaling System 7 (SS7) Message Transfer Part 3 (MTP3)—User Adaptation Layer (M3UA)," RFC 3332, pp. 1-113 (Sep. 2002).
Stewart et al., "Stream Control Transmission Protocol," Network Working Group RFC 2960, pp. 1-134 (Oct. 2000).
Greene et al., "Bi-Directional Session Setup Extension to Diameter," Internet Draft <draft-greene-diameter-ss7-session-00.txt>, pbs. 1-12 (Jul. 1998).
Jabbari, "Routing and Congestion Control in Common Channel Signaling System No. 7", Proceedings of the IEEE, vol. 80, No. 4, pp. 607-617 (Apr. 1992).

\* cited by examiner

METHODS, SYSTEMS, AND COMPUTER READABLE MEDIA FOR BALANCING DIAMETER MESSAGE TRAFFIC RECEIVED OVER LONG-LIVED DIAMETER CONNECTIONS

TECHNICAL FIELD

The subject matter described herein relates to processing signaling messages received over long-lived connections. More particularly, the subject matter described herein relates to methods, systems, and computer readable media for load balancing Diameter message traffic received over long-lived Diameter connections.

BACKGROUND

Diameter is a signaling protocol used extensively in core networks to carry subscriber and policy information among core network elements. One feature of Diameter is that Diameter connections between Diameter network elements, once established, may remain in service for long periods of time, such as weeks, months, or years. Once a connection is established, the message traffic sent over the connection can vary greatly over time. Accordingly, if the processing of Diameter message traffic is initially divided based on connections, this variation in traffic over a given connection can cause an imbalanced load among Diameter processing resources.

For example, in one Diameter message processing architecture, the message processors that perform Diameter connection layer processing also perform Diameter routing and/or application layer processing. Because the message processors each perform connection, routing, and/or application processing, all of the message processing for a given connection is performed by the same processor. As a result, if one connection assigned to one processor experiences a spike in traffic, that processor may become overburdened as compared to another processor whose assigned connections do not experience a spike in message traffic. However, because the connections are tied to the same processors that perform the routing and/or application processing for the messages, there is no ability to load balance the processing of the messages between the processors without tearing down and re-establishing the Diameter connections on different processors.

Requiring the tear down and re-establishment of Diameter connections to perform load balancing is undesirable as it results in unnecessary overhead on connection endpoints in tearing down and re-establishing the connections. In addition, once the connections are re-established to more evenly balance the load, any subsequent load imbalance on the newly assigned processors will require that the tearing down and re-establishing of the Diameter connections be repeated.

Accordingly, there exists a need for methods, systems, and computer readable media for balancing Diameter message traffic received over long lived Diameter connections.

SUMMARY

Methods, systems, and computer readable media for providing a workload balancer for balancing message traffic received over long-lived Diameter connections are disclosed. One exemplary workload balancer includes at least one connection front end processor for terminating Diameter connections with external nodes. The workload balancer further includes a plurality of Diameter back end processors for performing application or routing processing for the Diameter messages received over the Diameter connections. The at least one connection front end processor load shares Diameter messages received over existing Diameter connections among the back end processors.

According to another aspect of the subject matter described herein, a method for workload balancing of Diameter message traffic received over long-lived Diameter connections is provided. The method includes, at a connection front end processor, terminating Diameter connections with external nodes. The method further includes, at the connection front end processor, receiving Diameter messages over the Diameter connections. The method further includes, at the connection front end processor, load sharing the Diameter messages received over the Diameter connections among the plurality of back end processors. The method further includes, at the back end processors, performing application or routing processing for the messages received from the connection front end processor.

A workload balancer, as described herein, may comprise a special purpose computing platform that improves the technological field of processing Diameter signaling messages more efficiently in a communications network. Thus, a workload balancer may include hardware, such as a microprocessor and associated memory for performing the functions described herein. In one implementation, the connection front end processors and the routing and application back end processors may each be implemented on a printed circuit board or blade that is pluggable into a shelf that implements the overall functionality of the workload balancer. As new connection front ends and/or routing or application back ends are needed, additional blades can be added to the shelf. Similarly, when a connection front end processor or routing or application back end processor fails, the failed processor can be replaced by unplugging the blade from the shelf and plugging a new blade into the slot corresponding to the failed processor.

The subject matter described herein may be implemented in hardware, software, firmware, or any combination thereof. As such, the terms "function" or "module" as used herein refer to hardware, software and/or firmware components for implementing the feature(s) being described. In one exemplary implementation, the subject matter described herein may be implemented using a non-transitory computer readable medium having stored thereon computer executable instructions that when executed by the processor of a computer cause the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
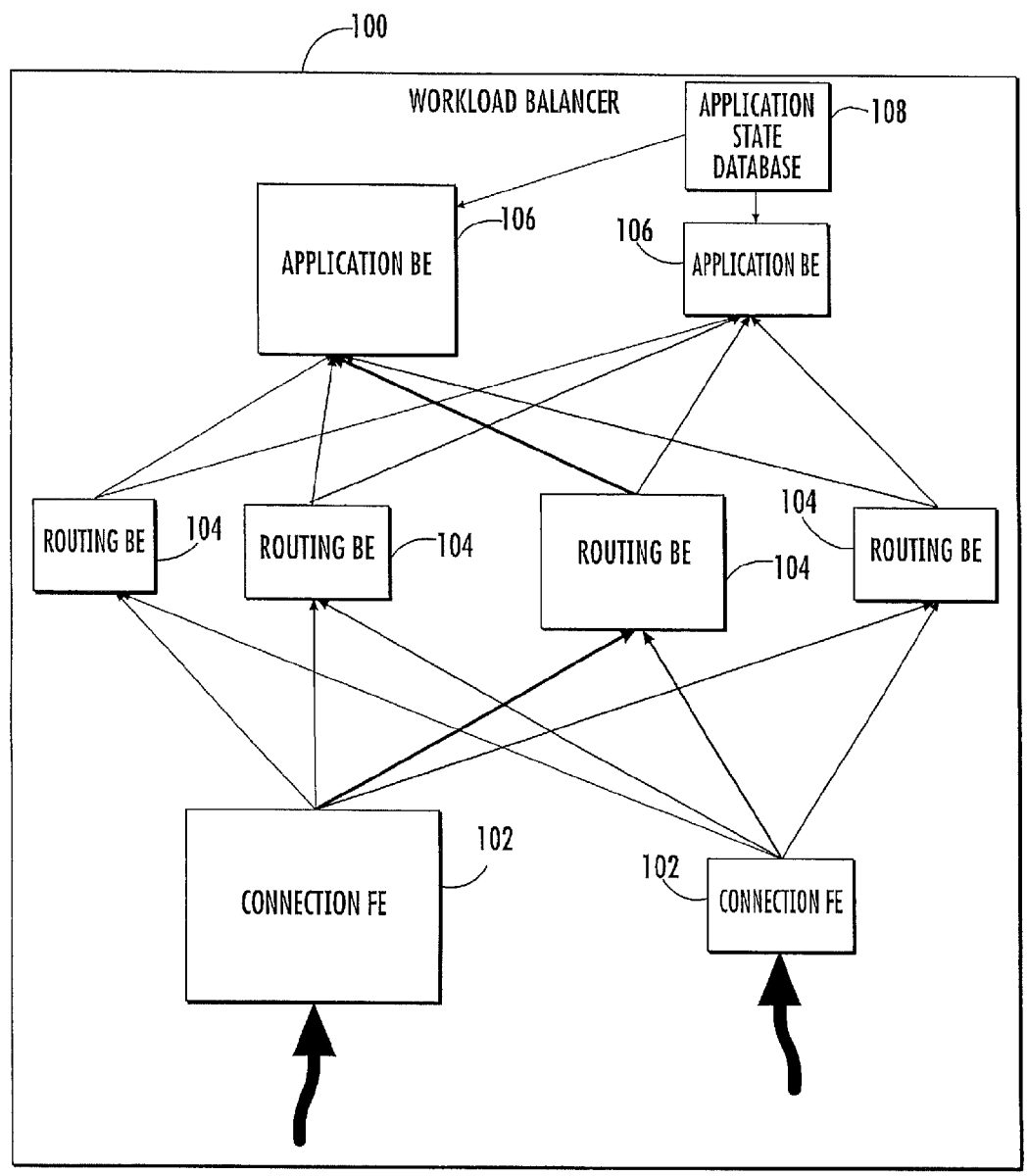
FIG. 1 is a block diagram illustrating a Diameter workload balancer for load sharing Diameter message traffic received over long-lived Diameter connections according to an embodiment of the subject matter described herein.

The subject matter described herein includes methods, systems, and computer readable media for balancing Diameter message traffic received over long-lived Diameter connections. FIG. 1 is a block diagram illustrating an exemplary workload balancer capable of load balancing Diameter message traffic received over long-lived Diameter connections. Referring to FIG. 1, a workload balancer 100 includes one or more connection front end processors 102, one or more routing back end processors 104, and one or more application back end processors 106. Connection front end processors 102 terminate Diameter connections with external nodes. By "terminating" the Diameter connections, it is meant that connection front end processors function as the local endpoint for Diameter connections with external nodes. For example, connection front end processors 102 may establish transport layer connections, such as stream control transmission protocol (SCTP) or transmission control protocol (TCP) connections with external Diameter nodes and establish Diameter connections on top of the transport layer connections. Details of such connection establishment will be provided below. Connection front end processors 102 may also maintain the connections, in the absence of Diameter traffic, by sending and/or responding to Diameter watchdog messages sent over the connections.

Connection front end processors 102 may load share Diameter messages received over connections terminated at the connection front end processors 102 among routing and application back end processors 104 and 106. Any suitable load sharing algorithm may be used. For example, load sharing may be performed using a static load sharing algorithm, such as a round robin algorithm, or a dynamic algorithm that considers the relative processing utilization of routing and application back end processors 104 and 106.

Because many Diameter messages may be related to the same session, it may be necessary to ensure that messages relating to the same session go to the same routing or application back end processor 104 or 106. Connection front end processors 102 may utilize the session identifier in Diameter messages to ensure that messages associated with the same transaction go to the same routing or application back end processor 104 or 106. The same session identifier may also be used to direct answers to Diameter request messages to the back end processors that process the requests. In yet another alternate implementation, the hop-by-hop identifier in Diameter messages can be used to ensure that messages associated with the same session, e.g., requests and corresponding answer messages, are sent to the same routing or application back end processor 104 or 106.

If either the session identifier or the hop-by-hop identifier is used to ensure that messages relating to the same session are sent to the same routing or back end processor, the connection front end processor that receives a particular message may perform a hash of the appropriate parameter (i.e., the session identifier or the hop-by-hop identifier) to determine whether a back end processor has been assigned for the session. After performing a hash of the session identifier, the connection front end processor may perform a lookup in a hash table to check for a back end processor assignment. If a back end processor has not been assigned to the session, the connection front end processor may assign the session to one of the back end processors based on relative processor utilization or other load balancing algorithm as described above. If the hash of the session identifier indicates that a back end processor has been assigned to the session, the connection front end processor 102 that received the message may send the message to the previously assigned back end processor. Thus, by using a hash of a session identifier or other parameter in a received message, connection front end processors 102 may load balance sessions received over long-lived connections among back end processors on a session by session basis.

Alternatively, rather than ensuring that messages relating to the same session are processed by the same application back end processor 106, state information regarding a session can be stored in a database accessible to all application back end processors 106. In such an implementation, Diameter request messages associated with the same session can be serviced by any application back end processor 106, since all application back end processors 106 will have the updated state of the session. In FIG. 1, this database is illustrated as application state database 108 and is internal to workload balancer 100. In an alternate implementation, application state database 108 may be external to workload balancer 100 but still accessible to application back end processors 106. If application back end processors 106 have access to an application state database 108, connection front end processors 102 may load share received Diameter messages requiring application processing among application back end processors without regard to the session to which messages belong. When an application processor gets a message that relates to an existing session, it may determine how to process the message using session state information received from application state database 108. When an application back end processor 106 receives and processes a message relating to a session, the application back end processor 106 sends updated state information for the session to database 108, which may replicate the update to the remaining application back end processors 106. Alternatively, application back end processors 106 may each maintain a copy of application state database 108 without an external application state database 108 and may send updates to each other as session state changes.

For some types of messages, it may be desirable to bypass load sharing among back end processors. For example, it may be desirable to give priority to Diameter message traffic relating to communications to or from emergency personnel. In such an embodiment, connection front end processors 102 could be configured to forward Diameter traffic on a Diameter connection known to be associated with emergency personnel communications to the same back end processor 106 or group of back end processors 106 and to refrain from sending non-emergency traffic to the back end processor 106 or group of back end processors 106 that are dynamically allocated for emergency communications, at least for a configurable time period. In such an example, the emergency traffic would bypass the load sharing mechanisms described herein. In another example, connection front end processors 102 may be configured to recognize individual message parameters associated with emergency communications and forward such messages to the same back end processor 106 or group of back end processors 106. In either scenario, the processing of non-emergency traffic would be automatically re-distributed among the non-emergency back end processors 106.

In another example, using the back end processors to prioritize processing of the Diameter message traffic identified as requiring prioritized treatment may include performing traffic shedding for ingress rate control of the non-prioritized Diameter message traffic or performing CPU overload control to preferentially process the Diameter message traffic identified as requiring prioritized processing.

According to an aspect of the subject matter described herein, peers may have redundant connections with different connection front end processors 102. If a peer detects a failure of one connection front end processor 102, the peer may automatically switch outgoing Diameter traffic to the connection front end processor 102 with which the peer has a redundant connection. Peers may also use connection front end processors in a load sharing configuration. In a load sharing configuration, peers may allocate connections to front end processors 102 in proportion to the respective processing capacities of connection front end processors 102. It should also be noted that the processing capacities of connection front end processors 102 may be equal or unequal.

Routing back end processors 104 perform Diameter routing for messages received from connection front end processors 102. Performing Diameter routing may include obtaining Diameter layer routing information from incoming messages and using that information to perform Diameter layer routing of the messages. Performing Diameter layer routing of the messages may include preforming a lookup in a Diameter routing database using parameters extracted from Diameter routing attribute value pairs (AVPs) in each message.

Some messages received by Diameter routing back end processors 104 may be routed to nodes external to workload balancer 100. As stated above, such messages may exit workload balancer on an egress connection front end processor 102 associated with a connection. Unlike traditional architectures, it is not necessary that the egress messages be routed to an egress Diameter routing layer processor. Other messages may be routed from Diameter routing back end processors 104 to application back end processors 106, which may be internal to workload balancer 100.

Application back end processors 106 perform application processing for received messages. Examples of application processing that may be performed by application back end processors 106 include Diameter-to-mobile application part (MAP) conversion, MAP-to-Diameter conversion, range-based address resolution, and Diameter traffic generation. Diameter-to-MAP conversion includes receiving Diameter signaling messages relating to mobility management in the SS7 network and mapping fields in the Diameter signaling messages to fields in MAP messages. The MAP messages may then be sent to a node external to workload balancer 100, such as a home subscriber server (HSS), home location register (HLR), or a mobile switching center (MSC) that uses MAP protocol. An application processor 106 that supports Diameter-to-MAP conversion may also support the reverse process of converting received MAP messages to Diameter messages.

Range-based address resolution may include extracting a mobile subscriber or mobile station identifier, such as a mobile subscriber ISDN number (MSISDN) or an international mobile station identifier (IMSI) from a received Diameter message and performing a lookup in a database that includes entries or records keyed by ranges of MSISDNs or IMSIs. If an identifier in a received message falls within a range of identifiers for an entry in the database, an address may be extracted from the database entry. The address may correspond to a destination for the message. For example, the address may correspond to a home subscriber server that contains subscription information for a subscriber whose identity appears in a received message. In such a case, the application back end processor 106 may either reply to the received message with the proper destination address for the message or may insert the destination address in the message and forward the message to a routing back end processor. The routing back end processor may then use the newly inserted destination information to route the message.

Diameter traffic generation may include transmitting one or more Diameter messages to an external node for diagnostic and/or performance purposes. Thus, an application back end processor 106 that contains a traffic generation application may send Diameter test messages to and receive Diameter test messages from an external node. The application back end processor 106 that supports such traffic generation may log the performance of the external node in processing the Diameter test messages.

A Diameter application back end processor 106 may support any combination of one or more of these and other applications without departing from the scope of the subject matter described herein. In addition, the functionality of Diameter routing back end processors 104 and application back end processors 106 may be combined on a single processor without departing from the scope of the subject matter described herein.

Once a routing back end processor 104 routes a message by determining the appropriate destination for the message, the routing back end processor 104 may forward the message to the connection front end processor 102 associated with the egress connection. Similarly, when an application back end processor 106 formulates a response to a received message, the response may exit workload balancer 100 via the connection front end processor 102 that is associated with the egress Diameter connection.

Figure 2:
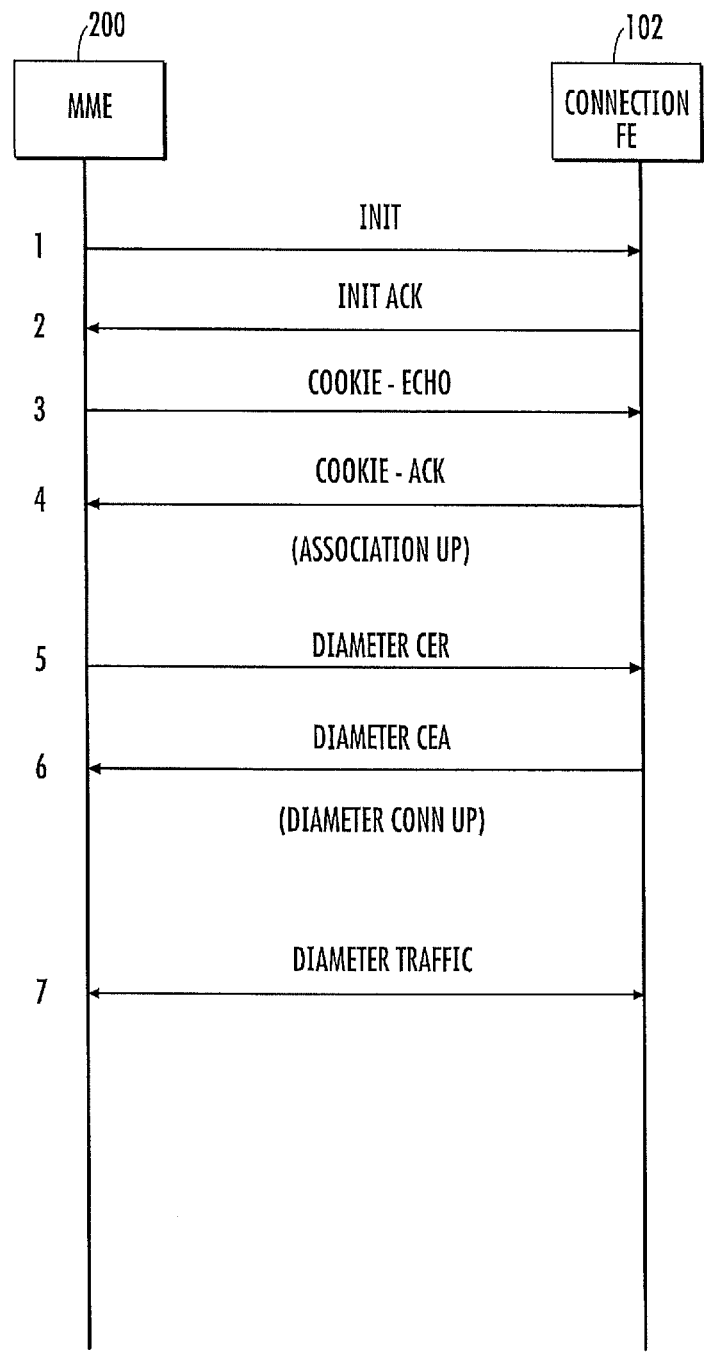
FIG. 2 is a message flow diagram illustrating an exemplary Diameter and transport layer connection establishment and maintenance that may be performed by a connection front end processor according to an embodiment of the subject matter described herein.

As stated above, Diameter connection front end processors 102 perform transport layer and Diameter connection establishment and maintenance. FIG. 2 is a message flow diagram illustrating connection establishment by a connection front end processor 102 where the transport layer connection is SCTP. Referring to FIG. 2, in line 1, a Diameter node, such as a mobility management entity (MME) 200 initiates an SCTP connection establishment procedure with a connection front end processor 102 of workload balancer 100 by sending an SCTP INIT chunk to connection front end processor 102. In SCTP, a connection is referred to as an association. The term "connection" will be used herein to refer generically to both SCTP associations and TCP connections. The INIT chunk includes the IP address of MME 200 and other optional parameters.

In response to the INIT chunk, in line 2 of the message flow diagram, connection front end processor 102 sends an INIT ACK chunk to MME 200. The INIT ACK chunk may include the IP address of connection front end processor 102 and other optional parameters. The INIT chunk may also include a state cookie that is sent back to MME 200. The next message sent in the message flow in line 3 is the cookie echo chunk, where MME sends the state cookie back to connection front end processor 102 with additional information that is inserted by the MME. In response to the cookie echo message, in line 4, connection front end processor 102 sends a cook ACK chunk back to MME 200. Once the cookie ACK chunk is received, an SCTP association is established between MME 200 and connection front end processor 102.

Once an SCTP association is established, a Diameter connection may be established over the SCTP association. Accordingly, in line 5, MME 200 sends a Diameter capabilities exchange request (CER) to connection front end processor 102. The Diameter capabilities exchange request message includes parameters, such as protocol version number, Diameter identity, security mechanisms, etc. In line 6 of the message flow diagram, connection front end processor 102 sends a Diameter capabilities answer message (CEA) to MME 200. The Diameter capabilities exchange answer message communicates the Diameter capabilities (e.g., which applications are supported by back end processors 106) of workload balancer 100 to MME 200.

Once the Diameter capabilities exchange has occurred, a Diameter connection exists between connection front end processor 102 and MME 200. Once such a connection exists, Diameter traffic can be sent and received over the connection, as indicated by line 7 in the message flow diagram.

The Diameter connection may be long-lived, i.e., lasting for days, weeks, months, or even years. By terminating the Diameter connection on connection front end processor 102, load sharing of Diameter traffic among back end processors 104 illustrated in FIG. 1 can be achieved without tearing down the Diameter connection. In the absence of Diameter traffic sent over the Diameter connection, connection front end processor 102 and MME 200 may exchange Diameter watchdog requests and Diameter watchdog answer messages to maintain the connection.

In the example illustrated in FIG. 2, the establishment of the transport layer and Diameter connections is initiated by MME 200. In an alternate implementation, connection front end processor 102 may initiate the establishment of the transport layer and/or the Diameter connections.

Figure 3:
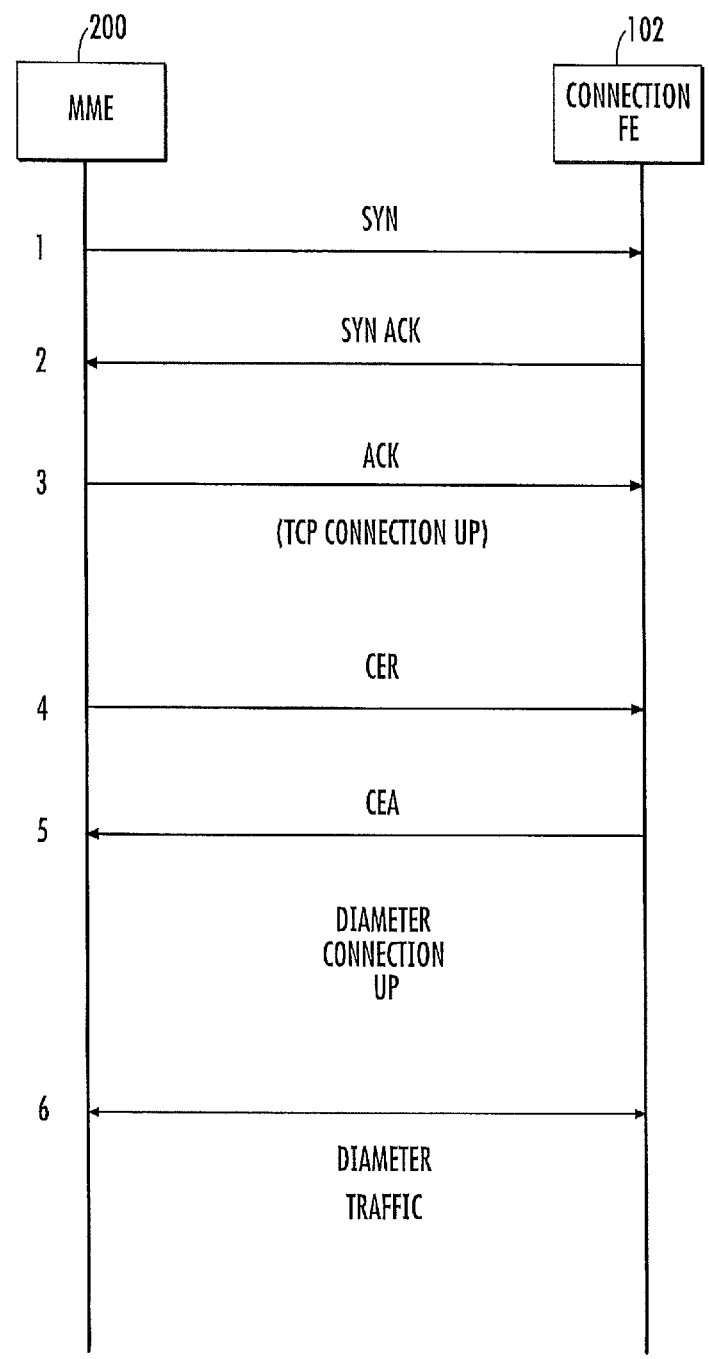
FIG. 3 is a message flow diagram illustrating Diameter and transport layer connection establishment and maintenance that may be performed by a connection front end processor according to an alternate embodiment of the subject matter described herein.

In FIG. 2, the Diameter connection is set up over an SCTP association. In an alternate implementation, the Diameter connection may be established over a TCP connection. FIG. 3 is a message flow diagram illustrating exemplary messages that may be exchanged between connection front end processor 102 and MME 200 in establishing a Diameter connection over a TCP connection. TCP uses a three-way handshake procedure to establish a connection. In FIG. 3, in line 1, MME 200 initiates the connection establishment process by sending a SYN message to connection front end processor 102. The SYN message includes the IP address of the sender as well as an initial sequence number to be used over the connection. In line 2, connection front end processor 102 responds with a SYN ACK message. The SYN ACK message includes the IP address of connection front end processor 102, the first sequence number used by connection front end processor 102 for the connection and acknowledgment indicating that the next expected sequence number by connection front end processor 102 is one greater than the sequence number received in the send message. In line 3 of the message flow diagram, MME 200 sends an ACK message to connection front end processor 102 indicating that the next sequence number expected from connection front end processor 102 is 1 plus the sequence number received in the SYN ACK message. Once the ACK message is received by connection front end processor 102, a TCP connection is established.

Once the TCP connection is established, a Diameter connection can be established over the TCP connection by sending capability exchange request and answer messages as indicated by lines 4 and 5 of the message flow diagram. Once the Diameter capabilities have been exchanged, the Diameter connection is up or established, and Diameter traffic can be sent over the connection as indicated by line 6 of the message flow diagram. Because the Diameter connection may be up for long periods of time, the Diameter traffic over the connection may vary. Because connection front end processor 102 terminates the Diameter and transport layer connections on connection front end processor 102, variations in message traffic over time can be accounted for without tearing down the connection by continually load balancing the message traffic among back end processors 104 and 106. As with the SCTP case, the subject matter described herein is not limited to MME 200 initiating the establishment of the transport layer and Diameter connections. Connection front end processor 102 may initiate the establishment of either or both connections without departing from the scope of the subject matter described herein.

Figure 4A:
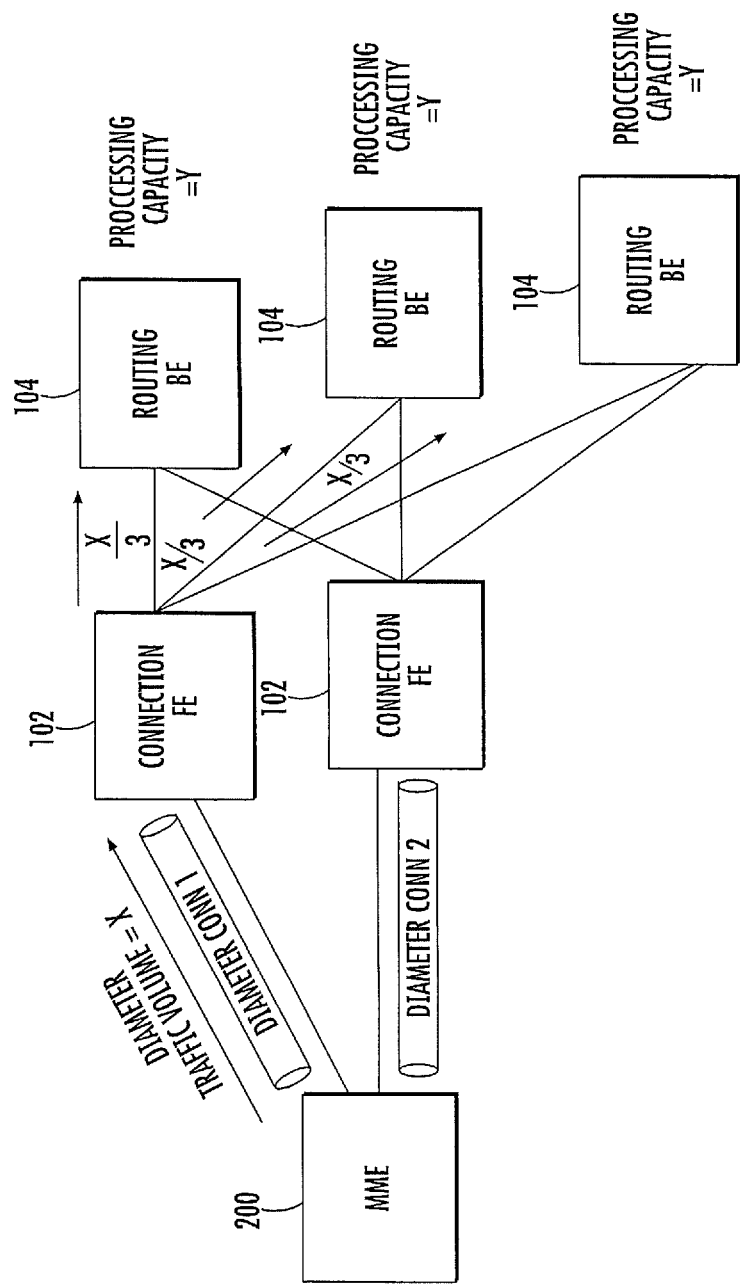
FIG. 4A is a block diagram illustrating a Diameter workload balancer load sharing Diameter message traffic received over long-lived Diameter connections among Diameter back end processors with equal processing capacities according to an embodiment of the subject matter described herein.

As stated above, one aspect of the subject matter described herein is the ability to load balance the processing of Diameter message traffic among routing or application back end processors 104 or 106. FIG. 4A is a network diagram illustrating the termination of Diameter connections at Diameter connection front end processors 102 and the load balancing of traffic received over the connections among routing back end processors 104. In FIG. 4A, it is assumed that MME 200 includes Diameter connections that are terminated with connection front end processors 102. In one implementation, connection front end processors 102 may operate in a redundant configuration. In the illustrated example, each routing back end processor 104 includes an equal processing capacity symbolically illustrated as Y. The symbolic representation Y may represent the processing capacity, i.e., the speed or bandwidth associated with each processor independently of the current load on each processor. Alternatively, the processing capacity Y may be a real time indication of the relative loading of each routing back end processor 104. Other information communicated between front end processors 102 and back end processors 104 and 106 may include system health (e.g. hardware functioning/failed, etc.), capacity, capabilities (e.g. can support particular applications that require a particular amount of memory, etc.), service status (e.g. in service, going out of service, out of service, etc.).

In the example illustrated in FIG. 4A, if the Diameter traffic volume entering connection front end processor 102 is symbolically illustrated as a quantity X, and each of the routing back end processors 104 has equal available processing capacities, connection front end processor 102 will load share the Diameter traffic received over the existing connection such that each routing back end gets a Diameter traffic volume equal to X/3. No matter how much the Diameter traffic received the Diameter connection changes over time, routing back end processors 104 will be equally loaded, provided that their processing capacities remain equal.

Although the example illustrated in FIG. 4A shows load sharing among routing back end processors 104, it is understood that the same or similar load sharing may be performed among application back end processors 106 without departing from the scope of the subject matter described herein.

Figure 4B:
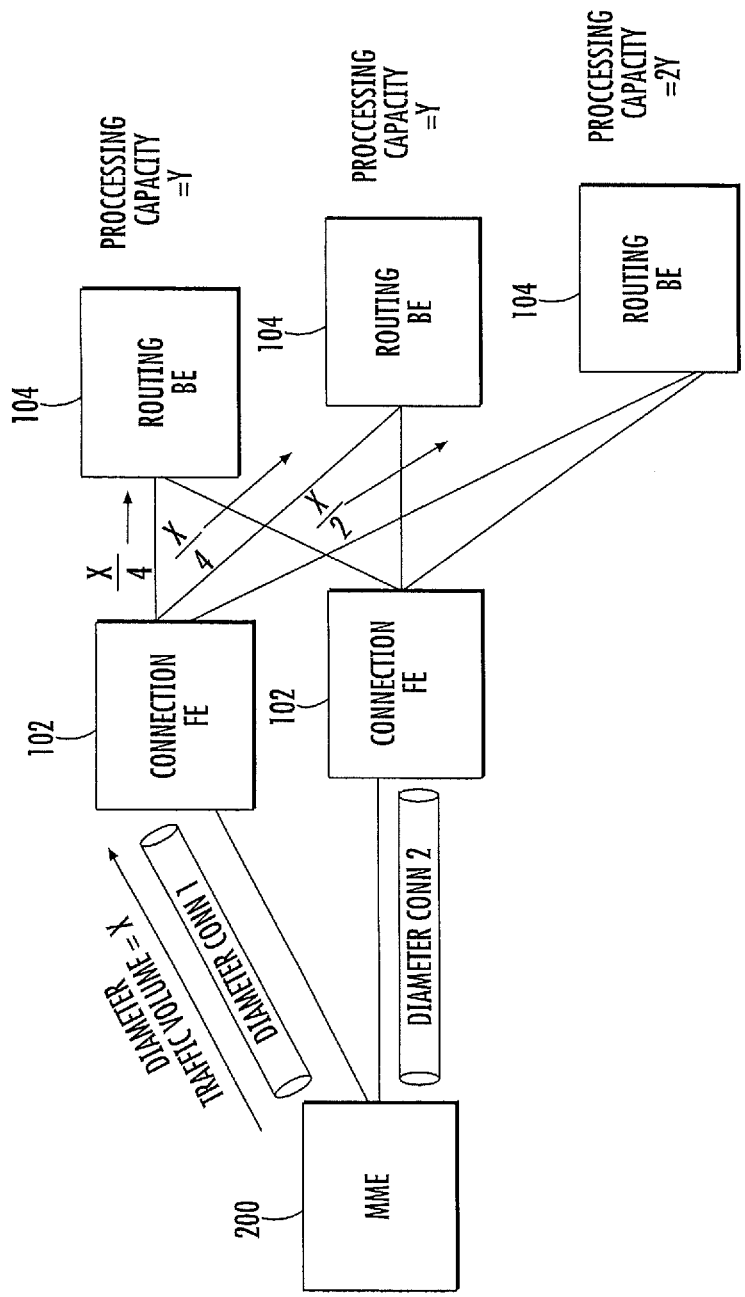
FIG. 4B is a block diagram illustrating a Diameter workload balancer load sharing Diameter message traffic received over long-lived Diameter connections among Diameter back end processors with unequal processing capacities according to an embodiment of the subject matter described herein.

According to another aspect of the subject matter described herein, connection front end processors 102 allow legacy Diameter back end processors to be used along with newer Diameter back end processors without requiring complete replacement of the legacy back end processors. Because the connections are terminated on connection front end processors 102, back end processors can be added based on the aggregate processing demand required by all of the connections handled by a particular workload balancer. In addition, the newly added back end processors may have the same or different processing capacities than the existing back end processors, and the connection front end processors can be configured to load share Diameter message traffic received over long-lived connections to back end processors in proportion to the relative processing capacities of the back end processors. FIG. 4B illustrates such an example. In FIG. 4B, two legacy back end processors have a processing capacity of Y. A newer back end processor 104 has a processing capacity of 2Y. Accordingly, if connection front end processor 102 receives a Diameter traffic volume of X over an existing Diameter connection with MME 200, legacy routing back end processors 104 will each receive a volume of traffic equal to X/4, and new routing back end processor 104 will receive a traffic volume equal to X/2 because routing back end processor 104 has twice the processing capacity of the legacy routing back end processors.

Figure 4C:
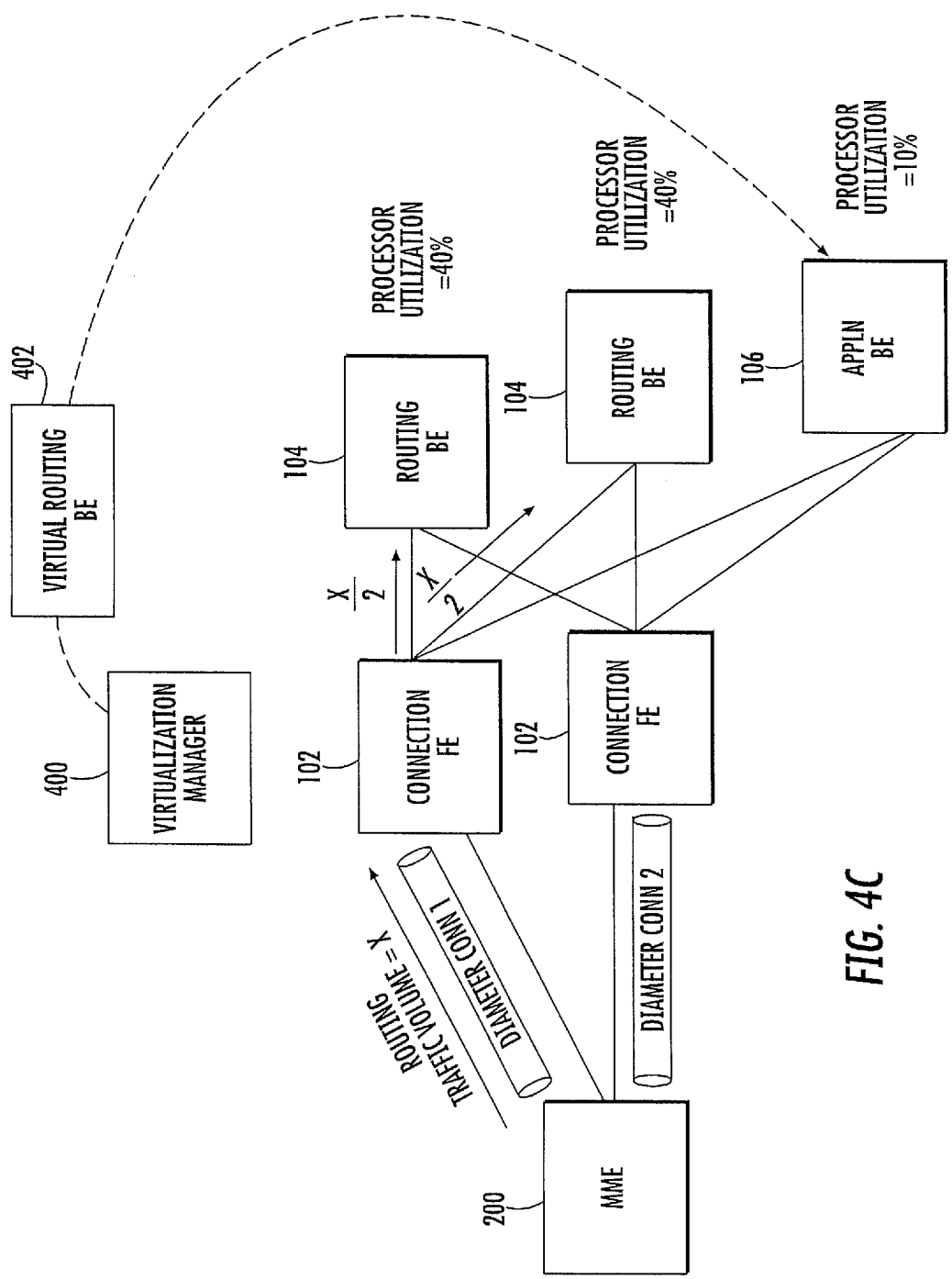
FIGS. 4C and 4D are block diagrams illustrating a Diameter workload balancer and a virtualization manager for dynamically instantiating a virtual back end routing instance, where the Diameter workload balancer load balances Diameter message traffic received over long-lived Diameter connections among Diameter back end processors, including the newly instantiated virtual routing back end processor according to an embodiment of the subject matter described herein.
Figure 4D:
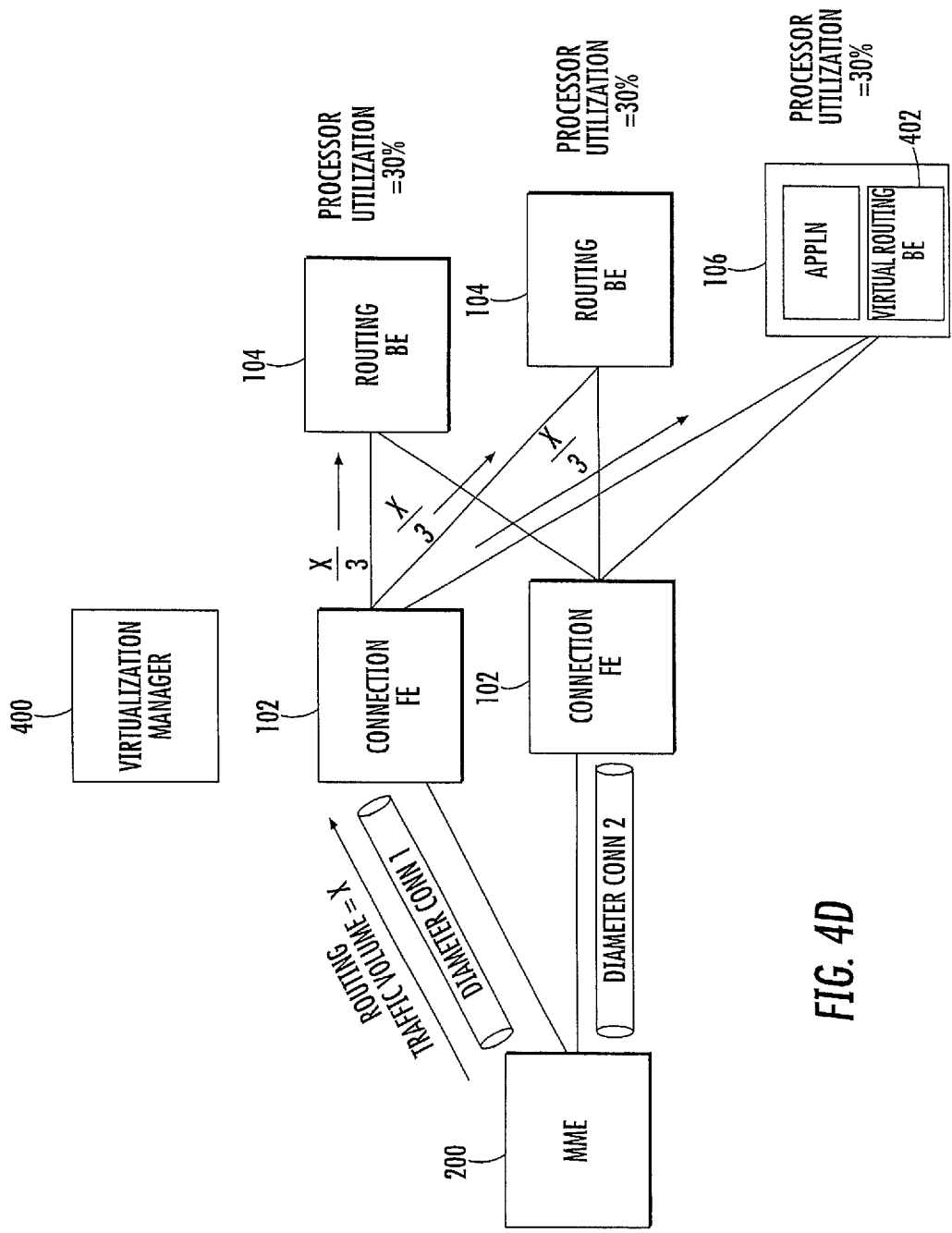

According to another aspect of the subject matter described herein, workload balancer 100 allows virtualization of back end resources to meet message processing demands and dynamic assignment of traffic flows to newly instantiated virtual back end resources. FIGS. 4C and 4D illustrate the virtualization readiness of the subject matter described herein. In FIG. 4C, routing back end processors 104 each have a processor utilization of 40%, which may be an engineered maximum in some communications network environments. However, application back end processor 106 may have a processor utilization of only 10%. In such a scenario, a virtualization manager 400 may create a virtual routing back end instance 402 and allocate resources on application back end processor 106 such that application back end processor 106 may also have Diameter routing functionality. Virtualization manager 400 may be a component of workload balancer 100 or may be located on a computing platform separate from workload balancer 100.

Once virtual routing resources are available on application back end processor 106, connection front end processor 102 may learn of the newly instantiated virtual back end processor from virtualization manager 400. Alternatively, once virtual routing back end instance 402 is created, it may inform connection front end processor 102 of its existence by any suitable mechanism. In one example, virtual routing back end instance 402 may notify connection front end processor 102 of its existence using a proprietary protocol running over TCP. Once connection front end processor 102 is aware of routing/application back end processor 106, connection front end processor 102 may load share the processing of messages that require routing among routing back end processors 104 and routing/application back end processor 106 such that the load among back end processors is more balanced.

For example, referring to FIG. 4D, once connection front end processor 102 becomes aware of the instantiation of virtual routing back end instance 402 on application/routing back end processor 106, connection front end processor 102 may load balance Diameter traffic among routing back ends 104 and application/routing back end processor 106. The load balancing algorithm in the illustrated example sends a traffic volume of X/3 to each of routing back end processor 104 and application/routing back end processor 106. However, unequal amounts of traffic may be sent to back end processors 104 and 106 based on their relative processor utilizations.

Although in the example illustrated in FIGS. 4C and 4D, virtualization manager 400 creates a virtual routing back end instance 402, the subject matter described herein is not limited to creating virtual routing back end instances. For example, virtualization manager 400 may also create virtual application back end instances and allocate resources on back end processors to those instances in the same manner illustrated in FIGS. 4C and 4D. Virtualization manager 400 may also create virtual connection front end processor instances to create additional connection front end processing capacity on an as needed basis. Further, virtualization manager 400 may monitor the processing load on virtual application and routing processing instances and allocate physical back end processing resources to or deallocate physical back end processing resources from the virtual application or routing back end processing instances based on the monitored processing load.

Connection front end processors 102 may monitor the processing capacities of routing and application back end processors 104 and 106 via a proprietary message exchange over the connection between connection front end processor 102 and routing and application back end processors 104 and 106. As a result, connection front end processor 102 can adaptively control the flow of traffic to back end processors 104 and 106 based on processing capacity feedback received at run time.

One advantage of the subject matter described herein is modularity. For example, a connection front end processor 102 can be deployed with one or more application back end processors 106 to form an end node without an intermediate routing back end processor 104. Similarly, a connection front end processor 102 can be deployed with one or more routing back end processors 104 and no application processors 106 to form a Diameter routing node, such as a Diameter signaling router (DSR). In yet another configuration, as illustrated in FIG. 1, connection front end processors 102 can be paired with routing and application back end processors 104 and 106 in the same node. Such a node may be considered a DSR in combination with a Diameter end node.

The modularity aspect of the subject matter described herein also allows back end processors from different vendors to be implemented in the same Diameter node. Application back end processors 106 that host different vendor applications can be deployed behind the same connection front end processor 102 with minimal reconfiguration of connection front end processor 102. For example, one application back end processor 106 may be a home subscriber server (HSS) application from vendor A. When the HSS from vendor A becomes overloaded, additional HSS processing capacity can be added by adding a new HSS application back end processor 106. The new HSS application back end processor 106 may be from the same vendor as the initial HSS application back end processor 106 or from a different vendor. As long as connection front end processor 102 is made aware of the existence and the application type of the new application back end processor 106, the fact that the application back end processor 106 may be from a different vendor than another application back end processor 106 within the same node does not adversely affect the functionality of workload balancer 100.

Another advantage of the subject matter described herein is leniency in redundancy requirements. Because load is automatically adjusted around routing and application back end processors 104 and 106, redundancy among such nodes is less important because failure of a back end processor is less individually important than failure of a front end processor. For example, if a back end processor fails, the remaining back end processors automatically take over the load of the failed back end processor. In contrast, in an architecture with connection, routing, and application processing all occurring on a single server, the failure of a server means the loss of connections as well as the loss of routing and application processing capacity.

As illustrated in FIG. 4A-4D, redundancy on connection front end processors 102 can be provided to ensure continuity in Diameter connectivity between Diameter nodes. For example, as described above, peers may have redundant connections with different front end processors 102. If a peer detects a failure of one connection front end processor 102, the peer may automatically switch outgoing Diameter traffic to the connection front end processor 102 with which the peer has a redundant connection.

Another advantage of the subject matter described herein is increased tolerance to traffic overload imbalance. For example, a connection front end processor 102 can avoid transient traffic spikes by continually balancing the message traffic during such spikes among back end processors 104 and 106. Even if connection front end processor 102 receives an imbalance in Diameter traffic over a period of time, the imbalance in traffic will have minimal effect on connection front end 102 because the only function performed by connection front end processor 102 is to forward the traffic to the appropriate routing or application back end processor 104 or 106. Further, due to the aggregation of connections at the front end, only a traffic spike from a large number of sources simultaneously can cause the connection front end to be overloaded. Such a scenario is believed to be unlikely.

Another advantage of the subject matter described herein is better utilization of processing resources. Because connection front end processors 102 and routing and application back end processors 104 and 106 each perform a specialized function, function-specific threading model can be implemented in each processor, resulting in reduced context switching as well as better cache locality.

Figure 4E:
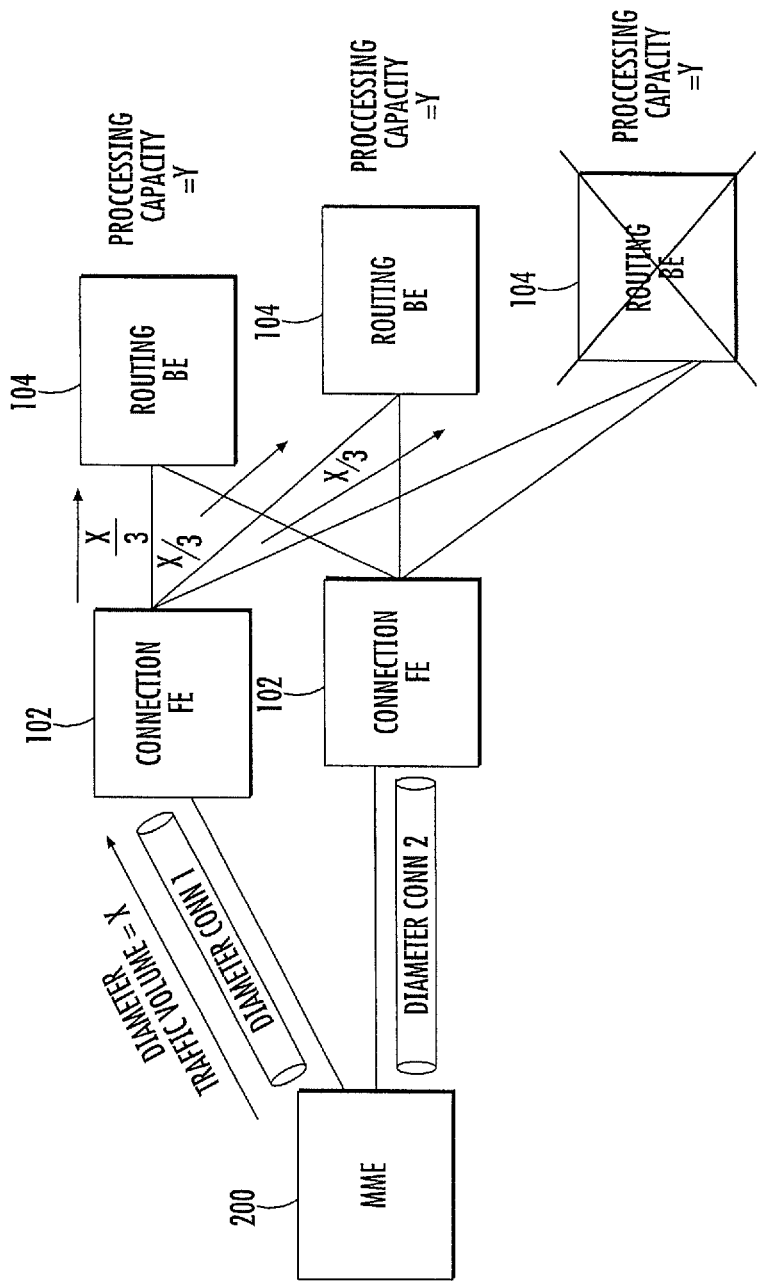
FIGS. 4E and 4F are block diagrams illustrating a Diameter workload balancer rebalancing the load among routing back end processors when a routing back end processor fails according to an embodiment of the subject matter described herein.
Figure 4F:
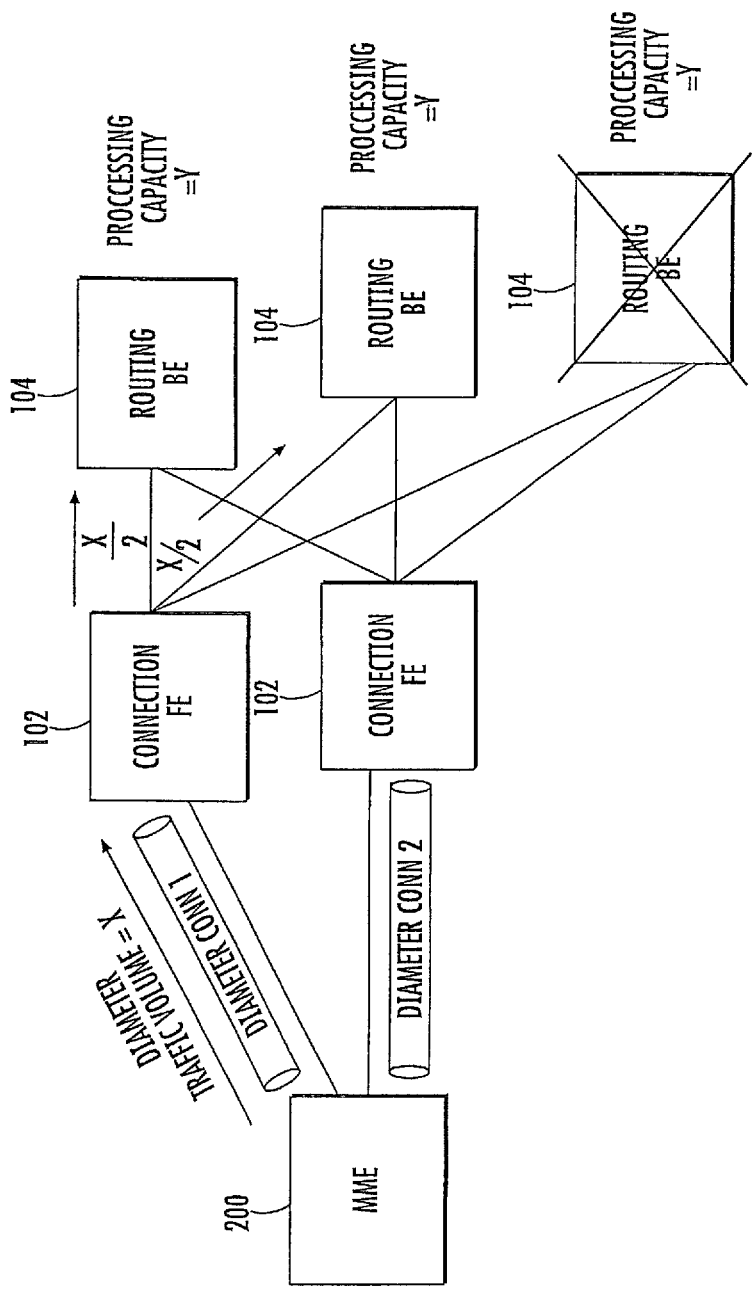

Yet another advantage of the subject matter described herein is increased fault tolerance among back end processing resources. For example, if one or more routing or application back end processors fail, the associated connection front end processor 102 may automatically redistribute the processing load of the failed processor among the remaining routing or application back end processors. This scenario is illustrated in FIGS. 4E and 4F. Referring to FIG. 4E, routing back end processors 104 are each assumed to have equal processing capacities. Accordingly, connection front end processor 102 load shares its received Diameter traffic volume of X among routing back end processors 104 such that routing back end processors 104 each receive volume of Diameter message traffic equal to X/3.

When one of routing back end processors 104 fails, connection front end processor 102 rebalances the load among existing routing back end processors 104 such that the remaining or existing routing back end processors 104 each receive a Diameter traffic volume equal to X/2, as indicated by FIG. 4F.

Figure 5:
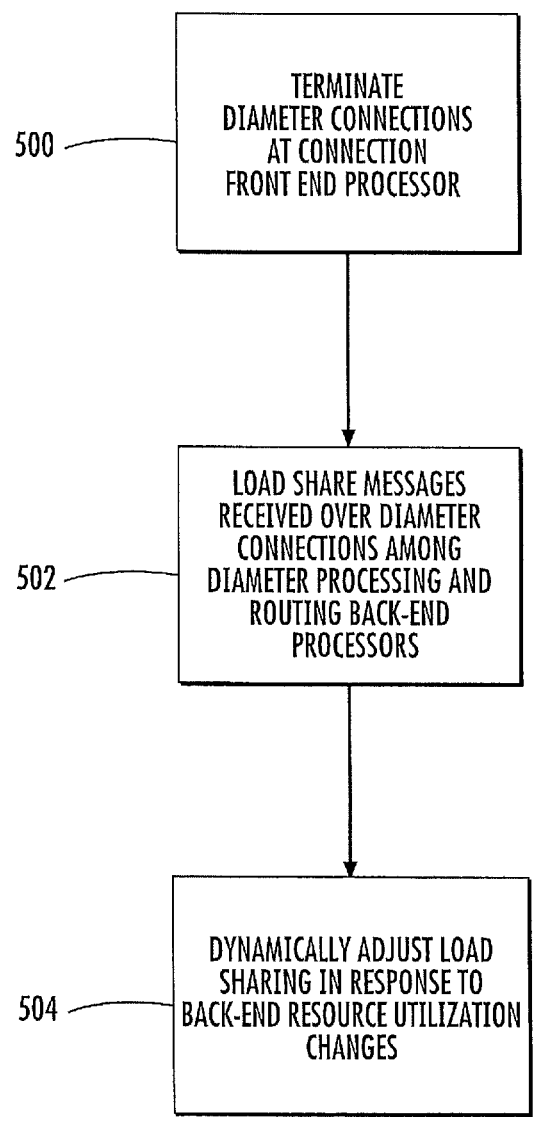
FIG. 5 is a flow chart illustrating an exemplary process for balancing Diameter message traffic received over long-lived connections according to an embodiment of the subject matter described herein.

FIG. 5 is flow chart illustrating an exemplary process. Referring to FIG. 5, in step 500, Diameter connections are terminated at connection front end processors. For example, the Diameter connections may be terminated at one of connection front end processors 102 as illustrated in FIGS. 1-4F.

In step 502, messages received over the Diameter connections are load shared among Diameter routing and application back end processors. For example, connection front end processors 102 may use a round robin or other load sharing algorithm that load shares message traffic received over existing Diameter connections to routing back end processors 104 and application back end processors 106.

In step 504, the load sharing is dynamically and automatically adjusted in response to back end resource utilization changes. As stated above, connection front end processors 102 may monitor the processing capacities of routing and application back end processors 104 and 106 and adaptively adjust the Diameter message load on the processors in real time at run time to equally balance the utilization or to meet a desired utilization goal. In addition, as described above, if new back end resources are added or if a back end processor fails, the load may be redistributed among the newly added or remaining back end processors.

As described above, a workload balancer as described herein increases the efficiency and reliability in processing and routing Diameter messages received over long-lived connections by decoupling connection processing from routing and application processing. In addition, such a decoupled architecture facilitates virtualization of Diameter routing and back end processing resources, and virtualization provides numerous advantages, including elasticity in resource allocation, the ability to dedicate resources, the ability to provide a network-function-as-a-service, etc.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A workload balancer for Diameter message traffic received long-lived Diameter connections, the workload balancer comprising:

a Diameter signaling router;

at least one connection front end processor located in the Diameter signaling router for terminating Diameter connections with external Diameter nodes;

a plurality of back end processors located in the Diameter signaling router for performing application or routing processing for Diameter messages received over the Diameter connections, wherein the at least one connection front end processor continually load shares the Diameter messages received over existing Diameter connections among the back end processors; and a virtualization manager for creating a virtual routing back end instance and allocating resources to the virtual routing back end instance on one of the back end processors in the Diameter signaling router with available processing capacity and that is currently functioning as an application back end processor.

2. The workload balancer of claim 1 wherein the at least one connection front end processor maintains transport layer connections, in addition to the Diameter connections, with the external nodes.

3. The workload balancer of claim 2 wherein the transport layer connections comprise stream control transmission protocol (SCTP) or transmission control protocol (TCP) connections.

4. The workload balancer of claim 1 wherein the at least one connection front end processor is configured to perform Diameter capabilities exchanges over the Diameter connections.

5. The workload balancer of claim 1 wherein the back end processors include a routing processor for routing the Diameter messages.

6. The workload balancer of claim 5 wherein the routing processor is configured to route the Diameter messages to an external node or to an application back end processor based on Diameter layer parameters in the Diameter messages.

7. The workload balancer of claim 1 wherein the back end processors include a Diameter application processor.

8. The workload balancer of claim 7 wherein the Diameter application processor comprises a Diameter-to-mobile application part (MAP) converter.

9. The workload balancer of claim 7 wherein the Diameter application processor includes a range-based address resolution processor.

10. The workload balancer of claim 7 wherein the Diameter application processor comprises a Diameter traffic generator.

11. The workload balancer of claim 1 comprising a Diameter signaling router, wherein the at least one connection front end processor and the back end processors are components of the Diameter signaling router.

12. The workload balancer of claim 1 wherein the virtualization manager dynamically allocates resources of the back end processors to virtual back end processing instances to handle the message traffic received over the Diameter connections.

13. The workload balancer of claim 1 wherein load sharing the messages among the back end processors includes continually rebalancing the flow of Diameter messages received over the Diameter connections to account for changes in the relative amount of traffic received over the Diameter connections over time.

14. The workload balancer of claim 1 wherein the at least one connection front end processor is configured to:
identify Diameter message traffic requiring prioritized treatment; and
use the back end processors to prioritize processing of the Diameter message traffic requiring prioritized treatment by:
bypassing the load balancing and forward the Diameter message traffic requiring prioritized treatment to a back end processor or group of back end processors and redistributing processing of non-prioritized Diameter message traffic among back end processors other than the back end processor or group of back end processors receiving the Diameter message traffic identified as requiring prioritized treatment;
performing traffic shedding for ingress rate control of the non-prioritized Diameter message traffic; or
performing CPU overload control to preferentially process the Diameter message traffic identified as requiring prioritized processing.

15. A method for workload balancing of Diameter message traffic received over long-lived Diameter connections, the method comprising:
at a connection front end processor located in a Diameter signaling router, terminating Diameter connections with external nodes;
at the connection front end processor, receiving Diameter messages over the Diameter connections;
at the connection front end processor, load sharing the Diameter messages received over the Diameter connections among a plurality of back end processors located in the Diameter signaling router;
at the back end processors, performing application or routing processing for the messages received from the connection front end processor; and
at a virtualization manager, creating a virtual routing back end instance and allocating resources to the virtual routing back end instance on one of the back end processors with available processing capacity and that is currently functioning as an application back end processor.

16. The method of claim 15 wherein back end processors include a Diameter routing processor.

17. The method of claim 15 wherein the connection front end processor and the back end processors are components of a Diameter signaling router (DSR).

18. The method of claim 15 wherein load sharing the messages among the back end processors includes continually rebalancing the flow of Diameter messages received over the Diameter connections to account for changes in the relative amount of traffic received over the Diameter connections.

19. The method of claim 15 comprising:
identifying Diameter message traffic requiring prioritized treatment;
using the back end processors to prioritize processing of the Diameter message traffic requiring prioritized treatment by:
bypassing the load balancing and forward the Diameter message traffic requiring prioritized treatment to a back end processor or group of back end processors and redistributing processing of non-prioritized Diameter message traffic among back end processors other than the back end processor or group of back end processors receiving the Diameter message traffic identified as requiring prioritized treatment;
performing traffic shedding for ingress rate control of the non-prioritized Diameter message traffic; or
performing CPU overload control to preferentially process the Diameter message traffic identified as requiring prioritized processing.

20. A non-transitory computer readable medium having stored thereon executable instructions that when executed by the processor of a computer control the computer to perform steps comprising:
- at a connection front end processor located in a Diameter signaling router, terminating Diameter connections with external nodes;
- at the connection front end processor, receiving Diameter messages over the Diameter connections;
- at the connection front end processor, load sharing the Diameter messages received over the Diameter connections among a plurality of back end processors located in the Diameter signaling router;
- at the back end processors, performing application or routing processing for the messages received from the connection front end processor; and
- at a virtualization manager, creating a virtual routing back end instance and allocating resources to the virtual routing back end instance on one of the back end processors with available processing capacity and that is currently functioning as an application back end processor.

21. A workload balancer for Diameter message traffic received long-lived Diameter connections, the workload balancer comprising:
- a Diameter signaling router;
- at least one connection front end processor located in the Diameter signaling router for terminating Diameter connections with external Diameter nodes, wherein the at least one connection front end processor includes a first connection front end processor that receives and responds to Diameter connection establishment signaling from a first Diameter node to establish and terminate a first Diameter connection between the first connection front end processor and the first Diameter node, wherein terminating the first Diameter connection includes functioning as a local endpoint for the first Diameter connection; and
- a plurality of back end processors located in the Diameter signaling router for performing application processing of or routing Diameter messages received over the Diameter connections, wherein the at least one connection front end processor continually load shares, among the back end processors that perform the routing, the Diameter messages requiring routing that are received over the first Diameter connection, wherein the back end processors that perform the routing route the Diameter messages and forward the Diameter messages to Diameter connection front end processors where the Diameter messages exit the Diameter signaling router without passing through an egress Diameter routing layer processor.

* * * * *

UNITED STATES PATENT AND TRADEMARK OFFICE
CERTIFICATE OF CORRECTION

PATENT NO. : 9,729,454 B2
APPLICATION NO. : 14/601906
DATED : August 8, 2017
INVENTOR(S) : Syed Mohsin Reza Zaidi et al.

Page 1 of 3

It is certified that error appears in the above-identified patent and that said Letters Patent is hereby corrected as shown below:

On the Title Page

Page 2, Column 2, Line 19:
Replace "Graig"
With --Craig--

Page 2, Column 2, Line 68:
Replace "ZL201180013814.2"
With --ZL201180018814.2--

Page 3, Column 2, Line 49:
Replace "rfc3538bis"
With --rfc3588bis--

Page 3, Column 2, Line 52:
Replace "Spectific"
With --Specific--

Page 3, Column 2, Line 55:
Replace "10/993,733"
With --10/993,738--

Page 3, Column 2, Line 63:
Replace "10/993,733"
With --10/993,738--

Signed and Sealed this
Sixth Day of August, 2019

Andrei Iancu
*Director of the United States Patent and Trademark Office*

CERTIFICATE OF CORRECTION (continued)
U.S. Pat. No. 9,729,454 B2

In the Drawings

Sheet 4 of 10, Fig. 4A, Line 2:
Replace "PROCCESSING"
With --PROCESSING--

Sheet 4 of 10, Fig. 4A, Line 6:
Replace "PROCCESSING"
With --PROCESSING--

Sheet 4 of 10, Fig. 4A, Line 10:
Replace "PROCCESSING"
With --PROCESSING--

Sheet 5 of 10, Fig. 4B, Line 2:
Replace "PROCCESSING"
With --PROCESSING--

Sheet 5 of 10, Fig. 4B, Line 6:
Replace "PROCCESSING"
With --PROCESSING--

Sheet 5 of 10, Fig. 4B, Line 10:
Replace "PROCCESSING"
With --PROCESSING--

Sheet 8 of 10, Fig. 4E, Line 2:
Replace "PROCCESSING"
With --PROCESSING--

Sheet 8 of 10, Fig. 4E, Line 6:
Replace "PROCCESSING"
With --PROCESSING--

Sheet 8 of 10, Fig. 4E, Line 10:
Replace "PROCCESSING"
With --PROCESSING--

Sheet 9 of 10, Fig. 4F, Line 2:
Replace "PROCCESSING"
With --PROCESSING--

Sheet 9 of 10, Fig. 4F, Line 6:
Replace "PROCCESSING"
With --PROCESSING--

CERTIFICATE OF CORRECTION (continued)
U.S. Pat. No. 9,729,454 B2

Sheet 9 of 10, Fig. 4F, Line 10:
Replace "PROCCESSING"
With --PROCESSING--